(12) United States Patent
Takagaki

(10) Patent No.: US 9,294,820 B2
(45) Date of Patent: Mar. 22, 2016

(54) CONTROL OF DISPLAY FOR SWITCHING BETWEEN CURRENTLY DISPLAYING CONTENT AND NEW CONTENT

(75) Inventor: Keiichi Takagaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 257 days.

(21) Appl. No.: 14/004,662

(22) PCT Filed: Mar. 13, 2012

(86) PCT No.: PCT/JP2012/001730
§ 371 (c)(1),
(2), (4) Date: Sep. 11, 2013

(87) PCT Pub. No.: WO2012/124315
PCT Pub. Date: Sep. 20, 2012

(65) Prior Publication Data
US 2014/0003790 A1    Jan. 2, 2014

(30) Foreign Application Priority Data

Mar. 15, 2011    (JP) .................................. 2011-056135

(51) Int. Cl.
*H04N 7/173*    (2011.01)
*H04N 21/472*    (2011.01)
*H04N 21/436*    (2011.01)

(52) U.S. Cl.
CPC ... *H04N 21/47217* (2013.01); *H04N 21/43622* (2013.01)

(58) Field of Classification Search
CPC .................... H04N 21/47217; H04N 21/43622
USPC ................................................ 386/230, 262
See application file for complete search history.

(56) References Cited

U.S. PATENT DOCUMENTS 7,774,343 B2 *   8/2010   Thiagarajan et al. ......... 707/736
7,890,647 B2     2/2011   Nakamura et al.
(Continued)

FOREIGN PATENT DOCUMENTS

JP    2002-077458 A    3/2002
JP    2005-250738 A    9/2005
(Continued)

OTHER PUBLICATIONS

International Search Report issued in PCT/JP2012/001730, dated May 1, 2012.

*Primary Examiner* — David Harvey
(74) *Attorney, Agent, or Firm* — McDermott Will & Emery LLP

(57) ABSTRACT

A content playback device includes a communication unit which communicates with a control device; a display unit which displays content; an input unit which accepts input; and a content playback authorization determination unit which determines whether to switch from content being displayed to acquired content, wherein the content playback authorization determination unit determines whether it is necessary to acquire an instruction as to whether to switch from the content being displayed to the acquired content, and when the content playback authorization determination unit acquires an authorization instruction or determines that it is not necessary to acquire the instruction, the content playback authorization determination unit switches from the content being displayed to the acquired content, and when the content playback authorization determination unit acquires a rejection instruction, the content playback authorization determination unit causes the display unit to continue display of the content being displayed.

7 Claims, 10 Drawing Sheets

(56) References Cited

U.S. PATENT DOCUMENTS

| | | |
|---|---|---|
| 8,447,867 B2 | 5/2013 | Nakamura et al. |
| 2004/0261096 A1* | 12/2004 | Matz .............................. 725/28 |
| 2006/0262220 A1 | 11/2006 | Nakamura et al. |
| 2008/0098474 A1 | 4/2008 | Nino |
| 2011/0113151 A1 | 5/2011 | Nakamura et al. |

FOREIGN PATENT DOCUMENTS

| | | |
|---|---|---|
| JP | 2006-332812 A | 12/2006 |
| JP | 2009-116893 A | 5/2009 |
| WO | 2005-111810 A1 | 11/2005 |

\* cited by examiner

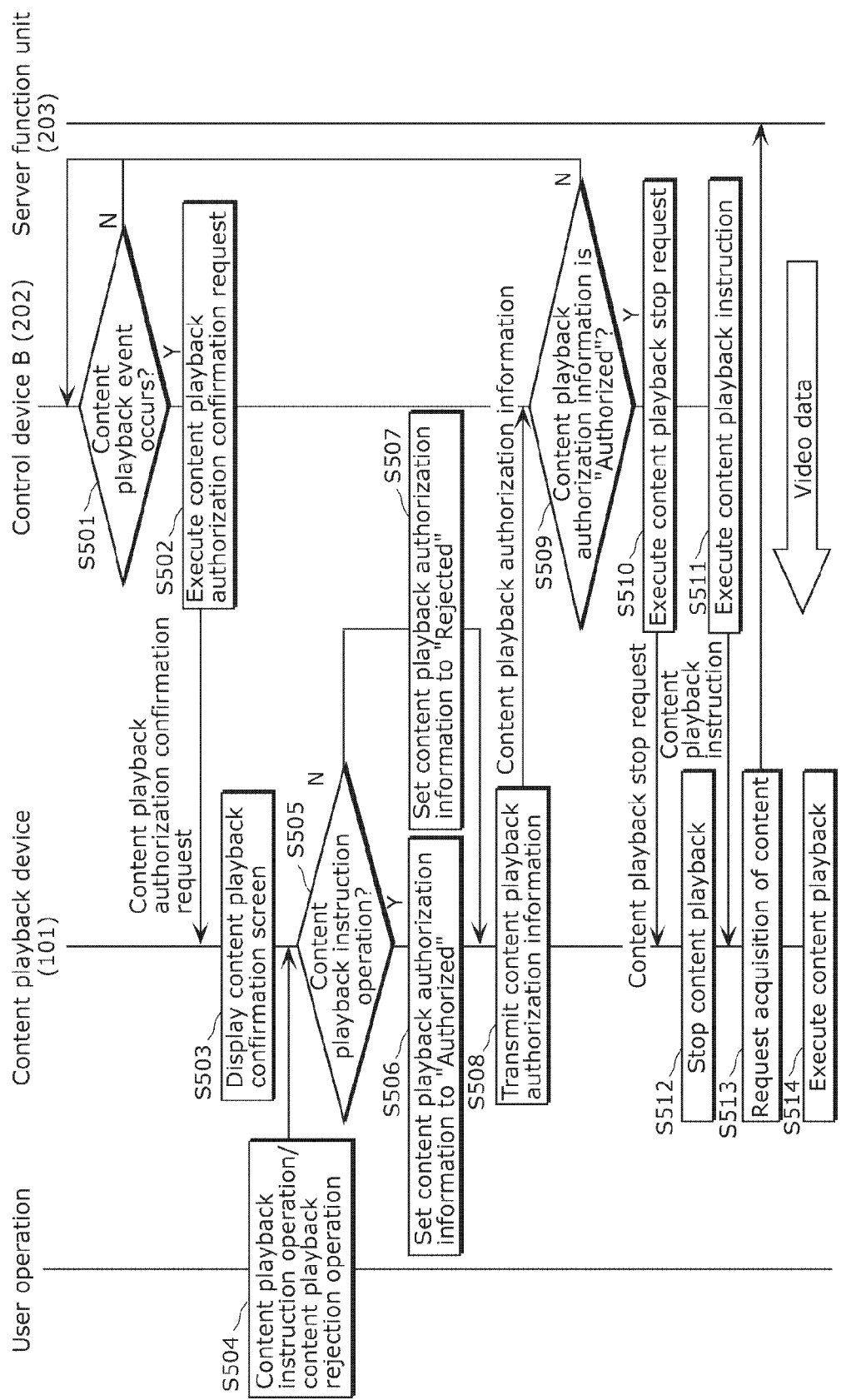

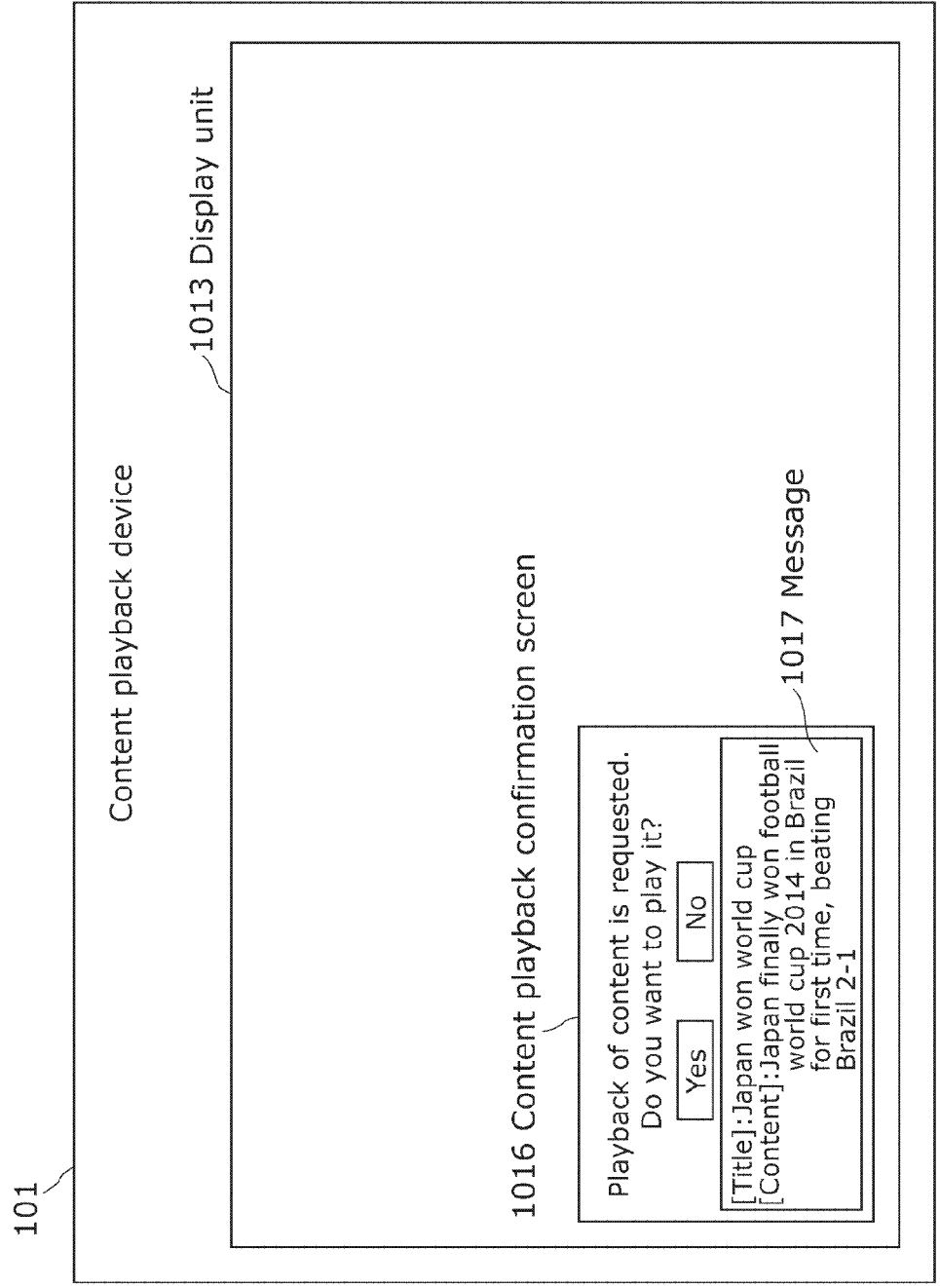

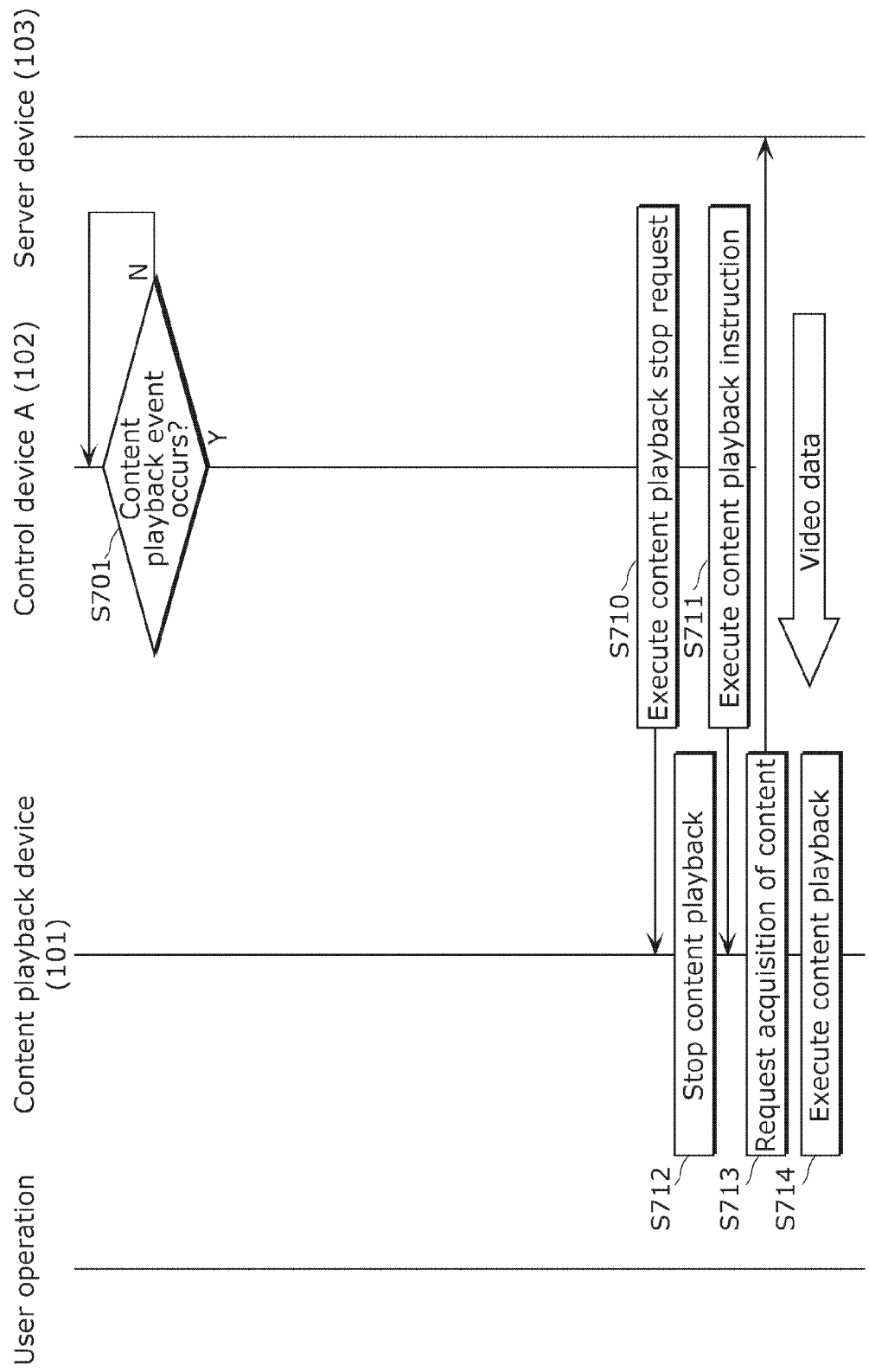

FIG. 8

```
■X_PlayConfirmationRequest
POST /upnp/control/AVTransport HTTP/1.1
Cache-Control: no-cache
Connection: Close
Pragma: no-cache
Content-Type: text/xml; charset="utf-8"
User-Agent: Sample UPnP/1.0 DLNADOC/1.50
SOAPAction; "urn:schemas-upnp-org:service:AVTransport:1#X_PlayConfirmation"
Content-Length:400
Host: 192.168.10.5:52323
<?xml version="1.0"?>
<SOAP-ENV:Envelope xmlns:SOAP-ENV=http://schemas.xmlsoap.org/soap/envelope/
    SOAP-ENV:encodingStyle="http://schemas.xmlsoap.org/soap/encoding/">
  <SOAP-ENV:Body>
    <m:X_PlayConfirmation xmlns:m="urn:schemas-upnp-org:service:AVTransport:1">
      <InstanceID xmlns:dt="urn:schemas-microsoft-com:datatypes" dt:dt="ui4">0</InstanceID>
      <X_MessageTitle>Japan won world cup</X_MessageTitle>
      <X_MessageBody>Japan finally won football world cup 2014 in Brazil for first time, beating
                    Brazil 2-1</X_MessageBody>
    </m:X_PlayConfirmation>
  </SOAP-ENV:Body>
</SOAP-ENV:Envelope>
```

FIG. 9

```
■X_playConfirmationResponse
HTTP/1.1 200 OK
Content-Length: 429
Content-Type: text/xml; charset="utf-8"
Connection:close
Date: Sat, 01 Jan 2000 00:34:55 GMT
Server: Sample OS 1.0
<?xml version="1.0"?>
<s:Envelope xmlns:s=http://schemas.xmlsoap.org/soap/envelope/
s:encodingStyle="http://schemas.xmlsoap.org/soap/encoding/">
    <s:Body>
        <u:X_playConfirmationResponse xmlns:u="urn:schemas-upnp-org:service:AVTransport:1">
            <X_PlayConfirmationState>OK</X_PlayConfirmationState>
        </u:X_playConfirmationResponse>
    </s:Body>
</s:Envelope>
```

FIG. 11

```
■PlayRequest
POST /upnp/control/AVTransport HTTP/1.1
Cache-Gontrol: no-cache
Connection: Close
Pragma: no-cache
Content-Type:text/xml;charset="utf-8"
User-Agent: Sample UPnP/1.0 DLNADOC/1.50
SOAPAction: "urn:schemas-upnp-org:service:AVTransport:1#Play"
Content-Length: 454
Host: 192.168.10.5:52323
<?xml version="1.0"?>
<SOAP-ENV:Envelope xmlns:SOAP-ENV=http://schemas.xmlsoap.org/soap/envelope/"
    SOAP-ENV:encodingStyle="http://schemas.xmlsoap.org/soap/encoding/">
  <SOAP-ENV:Body>
    <m:Play xmlns:m="urn:schemas-upnp-org:service:AVTransport:1">
      <InstanceID xmlns:dt="urn:schemas-microsoft-com:datatypes" dt:dt="ui4">0</InstanceID>
      <Speed xmlns:dt="urn:schemas-microsoft-com:datatypes" dt:dt="string">1</Speed>
      <X_PlayConfirmation></X_PlayConfirmation>
      <X_MessageTitle>Japan won world cup</X_MessageTitle>
      <X_MessageBody>Japan finally won football world cup 2014 in Brazil for first time, beating
                Brazil 2-1</X_MessageBody>
    </m:Play>
  </SOAP-ENV:Body>
</SOAP-ENV:Envelope>
```

CONTROL OF DISPLAY FOR SWITCHING BETWEEN CURRENTLY DISPLAYING CONTENT AND NEW CONTENT

RELATED APPLICATIONS

This application is the U.S. National Phase under 35 U.S.C. §371 of International Application No. PCT/JP2012/001730, filed on Mar. 13, 2012, which in turn claims the benefit of Japanese Application No. 2011-056135, filed on Mar. 15, 2011, the disclosures of which Applications are incorporated by reference herein.

TECHNICAL FIELD

The present invention relates to content playback devices, content playback systems, and content playback methods, and, more particularly, to a content playback device, a content playback system, and a content playback method which can play content according to a content playback instruction from a control device on a network.

BACKGROUND ART

An industrial association known as the digital living network alliance (DLNA) is promoting standardization activities for interconnecting electrical household appliances and personal computers from different manufacturers. According to a DLNA guideline defined by the DLNA, a function is provided in which a digital media player (DMP) acquires content data from a digital media server (DMS) connected thereto via a network, and allows for remote viewing of the content data. Further in the DLNA guideline, in accordance with instructions from a digital media controller (DMC), a digital media renderer (DMR) can also acquire content data from the digital media server (DMS) and allow for remote viewing of the content data. In the following description, the digital media renderer (DMR), the digital media server (DMS), and the digital media controller (DMC) are simply referred to as a content playback device, a server device, and a control device, respectively.

The following problems are possible in a system where the content playback device acquires content data from the server device and allows for remote viewing of the content, in accordance with the content playback instruction from the control device.

One problem is that when the content playback device playing a content item is given instructions from the control device to play another content item, the originally played content item is undesirably and unintentionally stopped. This case where content is originally played includes those wherein content data is acquired from the server device and the content data is remotely viewed, but also TV viewing using a TV tuner included in the content playback device, content playback by media player functionality which plays content stored in a SD card, a universal serial bus (USB) memory, a hard disk drive (HDD), a digital versatile disc (DVD), or a Blu-ray disc (BD), playback of external video input from outside such as game and a BD player, and use of various applications such as web site browsing using a browser.

For example, the following two use cases are possible in a system where the content playback device acquires content data from the server device and allows for remote viewing of the content data, in accordance with the content playback instruction from the control device.

A use case 1 is where a user operates the control device to select content, and issues the content playback instruction from the control device by manual operation at a time intended by the user to play the content. A use case 2 is where the control device automatically detects update of content in the server device on the Internet, at which time automatically issues the content playback instruction.

Each use case will be briefly described with reference to FIG. 1 and FIG. 2.

FIG. 1 is a diagram showing the configuration of the content playback system in the use case 1. Specifically, FIG. 1 is a diagram of a home network in which a control device A102, a content playback device 101, and a server device 103 are interconnected via a local area network (LAN) 104. A wired LAN (Ethernet (registered trademark)) or a wireless LAN (IEEE802.11) is often, but not exclusively, used for the LAN 104.

First, the user operates the control device A102 to acquire a listing of content in the server device 103, and selects content to be played. Next, the user uses the control device A102 to instruct the content playback device 101 to play the selected content. Thus, the content playback device 101 acquires content data to be played from the server device 103, and plays and displays the content data on a display unit (display) on the content playback device 101.

FIG. 2 is a diagram showing the configuration of the content playback system in the use case 2. Specifically, FIG. 2 is a diagram of a home network in which a control device B202 and the content playback device 101 are interconnected via the LAN 104. Here, it is assumed that the control device B202 connected to the Internet 205 via the LAN 104 can acquire various update information such as update information of news or weather forecast from the Internet 205, or update information of web sites on the Internet 205, and save corresponding content items (such as still images, videos, sounds) into a server function unit 203 in the control device B202.

A user can previously register, with the control device B202, pieces of information of interest among information to be updated on the Internet 205. Then, at a time when the registered information is updated, the control device B202 automatically gives the content playback instruction to the content playback device 101 to acquire and play content which corresponds to the updated information downloaded to the server function unit 203. Then, the user can view the content by seeing the display unit (display) on the content playback device 101.

CITATION LIST

Patent Literature

[PTL 1] Japanese Unexamined Patent Application Publication No. 2006-332812

SUMMARY OF INVENTION

Technical Problem

The problem "unintentionally giving the content playback instruction for another content item" in the use case 1 often occurs due to user operation errors. On the other hand, "unintentionally giving the content playback instruction for another content item" in the use case 2 often occurs due to that, among the registered update information, "whether the user is actually willing to stop the originally being played content, in order to view the other content item at that time" depends on the content or the time at which the content playback instruction is given.

The present invention is made in view of the above problems, and has an object to provide a content playback device, a content playback system, and a content playback method which effectively prevent, while a content item is being viewed, another content item from being played unintentionally.

Solution to Problem

To solve the above problems, a content playback device, a content playback system, and a content playback method according to one embodiment of the present invention employ means and processing procedures as follows.

A content playback device according to one embodiment of the present invention plays content, which is acquired from a server, in accordance with control of a control device. Specifically, the content playback device includes a communication unit configured to communicate with the control device and the server; a display unit configured to display content; an input unit configured to receive input from a user; and a content playback authorization determination unit configured to determine whether to interrupt content being displayed on the display unit and switch from the content being displayed to acquired content which is acquired from the server through the communication unit. The content playback authorization determination unit determines, based on the control of the control device, whether it is necessary to acquire, from the user through the input unit, an instruction as to whether to switch from the content being displayed to the acquired content, switches content displayed on the display unit from the content being displayed to the acquired content, when the content playback authorization determination unit acquires from the user a content switch authorization instruction indicating that the content being displayed is to be switched to the acquired content or when the content playback authorization determination unit determines that it is not necessary to acquire the instruction, and causes the display unit to continue display of the content being displayed, when the content playback authorization determination unit acquires from the user a content switch rejection instruction indicating that the content being displayed is not to be switched to the acquired content.

According to the above configuration, a content item can be effectively prevented from being played unintentionally while another content item is being viewed by a user, by adaptively switching between: whether to authorize display of the acquired content; and whether to confirm to a user as to whether to switch content.

As an example, the content playback authorization determination unit may determine that it is necessary to acquire the instruction from the user, when the content playback authorization determination unit acquires, from the control device through the communication unit, a content playback confirmation request signal requesting acquisition of the instruction from the user, and determine that it is not necessary to acquire the instruction from the user, when the content playback authorization determination unit acquires, from the control device through the communication unit, a content playback instruction signal instructing playback of the acquired content without acquiring the content playback confirmation request signal.

As another example, when the content playback authorization determination unit acquires, from the control device through the communication unit, a content playback instruction signal instructing playback of the acquired content, the content playback authorization determination unit may determine that it is necessary to acquire the instruction from the user when content playback confirmation request information requesting acquisition of the instruction from the user is included in the content playback instruction signal, and determine that it is not necessary to acquire the instruction from the user when the content playback confirmation request information is not included in the content playback instruction signal.

As still another example, when the content playback authorization determination unit acquires, from the control device through the communication unit, a content playback instruction signal instructing playback of the acquired content, the content playback authorization determination unit may determine that it is necessary to acquire the instruction from the user when transmission of the content playback instruction signal automatically occurs, and determine that it is not necessary to acquire the instruction from the user when the transmission of the content playback instruction signal is made by manual operation by the user.

As still another example, the content playback authorization determination may pre-store a table in which attribute information of the control device, a result of determining whether it is necessary to acquire the instruction from the user, and a result of determining whether switching from the content being displayed to the acquired content is to be authorized are associated with one another, and operate in accordance with the results associated with the attribute information of the control device from which a content playback instruction signal instructing playback of the acquired content is transmitted.

Moreover, the content playback authorization determination unit may transmit, to the control device through the communication unit, a content playback authorizing signal which authorizes playback of the acquired content, to switch from the content being displayed to the acquired content, and transmit, to the control device through the communication unit, a content playback prohibiting signal which prohibits the playback of the acquired content, to continue display of the content being displayed.

Moreover, the content playback authorization determination unit may cause the display unit to display a content playback confirmation screen prompting the user to input the instruction through the input unit when the content playback authorization determination unit determines that it is necessary to acquire the instruction from the user.

Moreover, the communication unit is configured to communicate with the control device and the server, using a communication protocol conforming to a digital living network alliance (DLNA) standard.

A content playback system according to one embodiment of the present invention includes a control device, a server, and a content playback device. The content playback device includes a communication unit configured to communicate with the control device and the server; a display unit configured to display content; an input unit configured to receive input from a user; and a content playback authorization determination unit configured to determine whether to interrupt content being displayed on the display unit and switch from the content being displayed to acquired content which is acquired from the server through the communication unit. The content playback authorization determination unit determines, based on control of the control device, whether it is necessary to acquire, from the user through the input unit, an instruction as to whether to switch from the content being displayed to the acquired content, switches content displayed on the display unit from the content being displayed to the acquired content, when the content playback authorization determination unit acquires from the user a content switch authorization instruction indicating that the content being displayed is to be switched to the acquired content or when the content playback authorization determination unit determines that it is not necessary to acquire the instruction, and causes the display unit to continue display of the content being displayed, when the content playback authorization determination unit acquires from the user a content switch rejection instruction indicating that the content being displayed is not to be switched to the acquired content.

A content playback method according to one embodiment of the present invention is executed by a content playback device including: a communication unit configured to communicate with a control device and a server; a display unit configured to display content; and an input unit configured to receive input from a user, to play content acquired from the server in accordance with control of the control device. Specifically, the content playback method includes (a) determining whether to interrupt content being displayed on the display unit and switch from the content being displayed to acquired content which is acquired from the server through the communication unit. Step (a) includes: determining, based on the control of the control device, whether it is necessary to acquire, from the user through the input unit, an instruction as to whether to switch from the content being displayed to the acquired content; switching content displayed on the display unit from the content being displayed to the acquired content, when a content switch authorization instruction indicating that the content being displayed is to be switched to the acquired content is acquired from the user or when it is determined that it is not necessary to acquire the instruction; and causing the display unit to continue display of the content being displayed, when a content switch rejection instruction indicating that the content being displayed is not to be switched to the acquired content is acquired from the user.

In this manner, based on the content playback instruction or other information which is transmitted from the control device, displaying and not displaying the content playback confirmation screen as to whether the content playback device may play content can be switched therebetween.

For example, as in the use case 1, when the user operates the control device to select content, and issues the content playback instruction from the server by manual operation at a time intended by the user to play the content, the content playback confirmation screen is displayed on the control device and the content playback confirmation screen is not displayed on the content playback device. On the other hand, as in the use case 2, when the control device automatically detects update of content in a server on the Internet at which time automatically issues the content playback instruction, the content playback device displays the content playback confirmation screen so that the user can see the screen of the content playback device to determine whether to stop the currently played content to starts playback of content for which the content playback instruction is given. The above can both be achieved without changing setting of the content playback device.

It should be noted that the present invention may be implemented not only in a device and a method but also in a program for causing a computer to execute steps included in the method, a computer-readable recording medium such as CD-ROM having stored therein the program, and in information, data, or a signal which indicates the program. In addition, the program, information, data, and signal may be distributed via communications network such as the Internet. Moreover, part or the whole of the components included in the device may be implemented in large scale integration (LSI).

Advantageous Effects of Invention

According to the present invention, the content playback device, the content playback system, and the content playback method can be obtained which effectively prevent, while a content item is being viewed, another content item from being played unintentionally, by adaptively switching between: whether to ask a user to switch between content items; and whether to authorize the display of the acquired content.

BRIEF DESCRIPTION OF DRAWINGS

FIG. 5 is a flowchart illustrating processing for the use case 2 of a content playback device according to the embodiment 1 of the present invention.

FIG. 6 is a diagram showing a display example of a content playback confirmation screen according to the embodiment 1 of the present invention.

FIG. 7 is a flowchart illustrating processing for the use case 1 of a content playback device according to the embodiment 1 of the present invention.

FIG. 8 is a diagram showing an example of a telegram of a content playback authorization confirmation request according to the embodiment 1 of the present invention.

FIG. 9 is a diagram showing an example of a telegram of content playback authorization information according to the embodiment 1 of the present invention.

FIG. 11 is a diagram showing an example of a telegram of a content playback instruction which includes a content playback authorization confirmation request according to the embodiment 2 of the present invention.

DESCRIPTION OF EMBODIMENTS

First, an example of workaround for the above problems will be described.

For example, Patent Literature (PTL) 1 discloses workaround to a problem that a content playback instruction for a content item is given unintentionally due to user operation errors, ending up stopping the originally being played another content item. Specifically, PTL 1 discloses a way of avoiding the problem in which a content playback confirmation screen is displayed on a screen of the control device if a content item is already being played back on the content playback device when playback instructions of another content item are given remotely.

In the conventional method disclosed in PTL 1 described above, however, it is necessary that a user checks the content playback confirmation screen displayed on the screen of the control device before operating the control device. Thus, there arises a problem, similarly to the use case 2, that it is difficult to apply the conventional method disclosed in PTL 1 to cases where a user is not seeing the display unit of the control device B202 at a time when the content playback instruction is given from the control device B202.

Here, assuming that the conventional method disclosed in PTL 1 is applied to the use case 2, it is conceivable that the user, in fact, often does not even notice that the time has come at which the content playback instruction is given. Thus, again, it can be said that the conventional method disclosed in PTL 1 is not applicable to the use case 2.

Also, for the use case 2, another method is possible in which the content playback confirmation screen is unconditionally displayed on the display unit of the content playback device 101 at a time when the content playback device 101 receives the content playback instruction from the control device B202.

Figure 1:
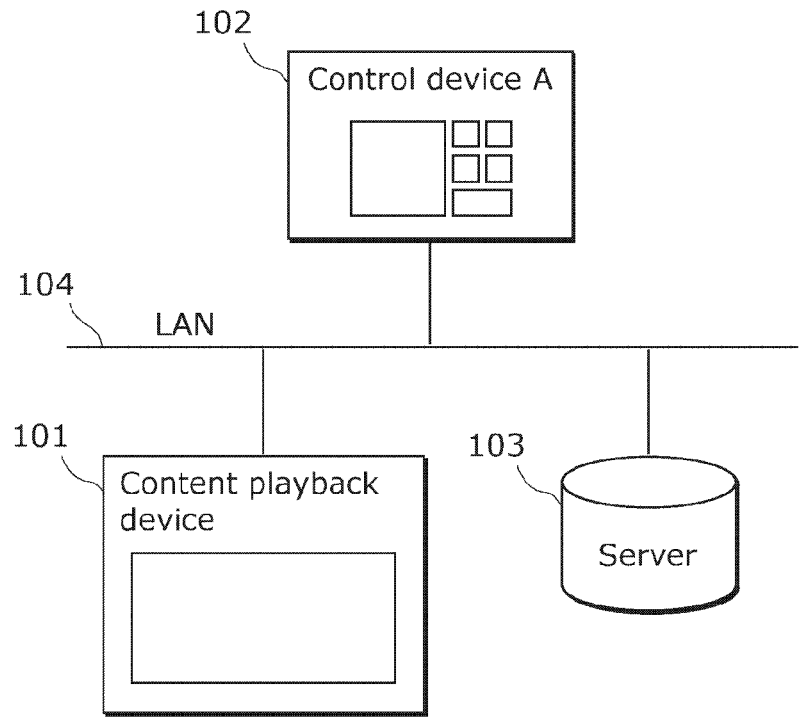
FIG. 1 is a diagram showing the configuration of a content playback system in a use case 1 according to the present invention.
Figure 2:
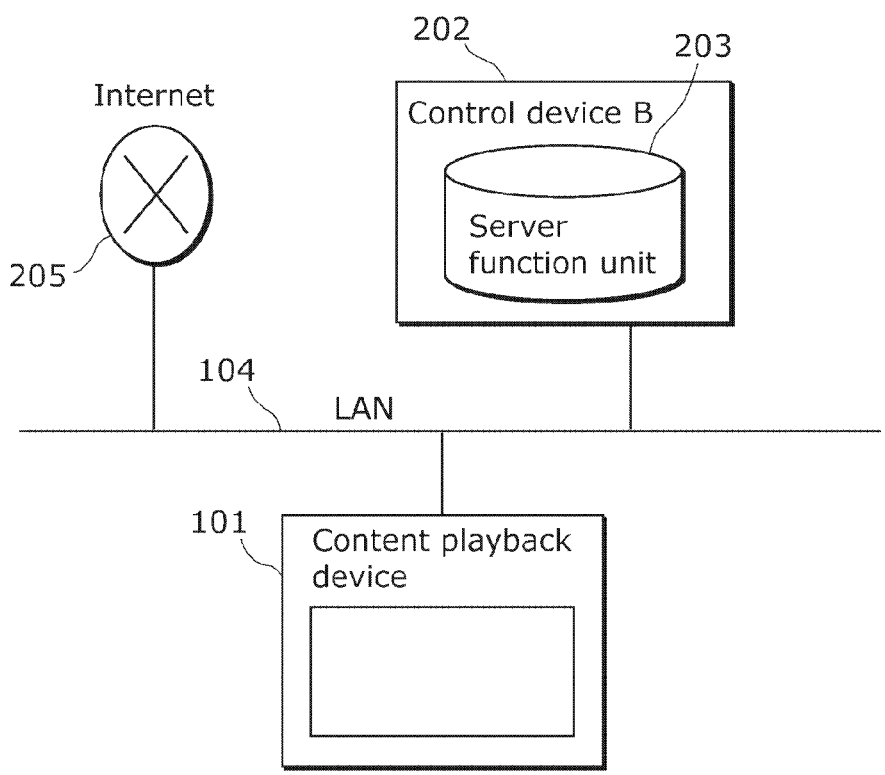
FIG. 2 is a diagram showing the configuration of a content playback system in a use case 2 according to the present invention.
Figure 3:
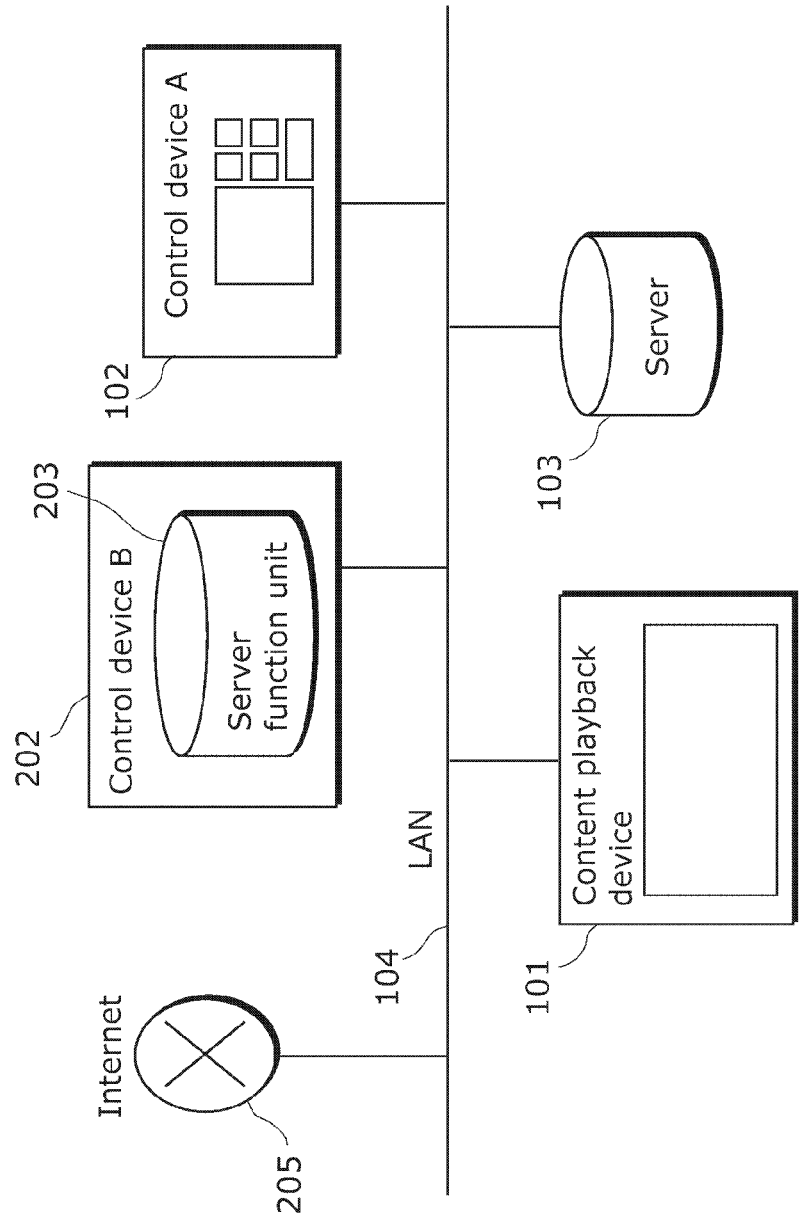
FIG. 3 is a diagram showing the configuration of a content playback system where the use cases 1 and 2 according to the present invention are mixed.

The above case causes even an additional problem if the content playback device 101 is used for both the use case 1 and the use case 2 as shown in FIG. 3. In other words, when the content playback confirmation screen is outputted on the content playback device 101 for the sake of the use case 2, if the content playback device 101 is to be used for the use case 1, although the user is intended to operate the control device A102 to instruct the playback of content, the user cannot start playback of the content unless performing operation of the content playback device 101 in addition to performing operation of the control device A102.

Thus, embodiments of the present invention solve the conventional problems described above, by employing an approach different from the one used in PTL 1. Hereinafter, embodiments of the present invention will be described, with reference to the accompanying drawings. It should be noted that components referred to by same reference signs perform the same operations in the embodiments, and thus the description may not be repeated.

The embodiments described below are each merely a preferred illustration of the present invention. Values, shapes, materials, components, disposition or a form of connection between the components, steps, and the order of the steps are merely illustrative, and are not intended to limit the present invention. The present invention is indicated by the scope of the appended claims. Thus, among components of the below embodiments, components not set forth in the independent claims indicating the top level concept of the present invention are not necessary to achieve the present invention but will be described as components for preferable embodiments.

Embodiment 1

An embodiment 1 of the present invention will be described, with reference to the configuration of a content playback system shown in FIG. 3, by way of example.

A content playback system shown in FIG. 3 includes the control device A102, the control device B202, the content playback device 101, and the server device 103. The control device A102, the control device B202, the content playback device 101, and the server device 103 are interconnected via the LAN 104. The LAN 104 is connected to the Internet 205 as well. Here, while there may be various connections between the LAN 104 and the Internet 205, the description thereof is omitted herein.

Figure 4:
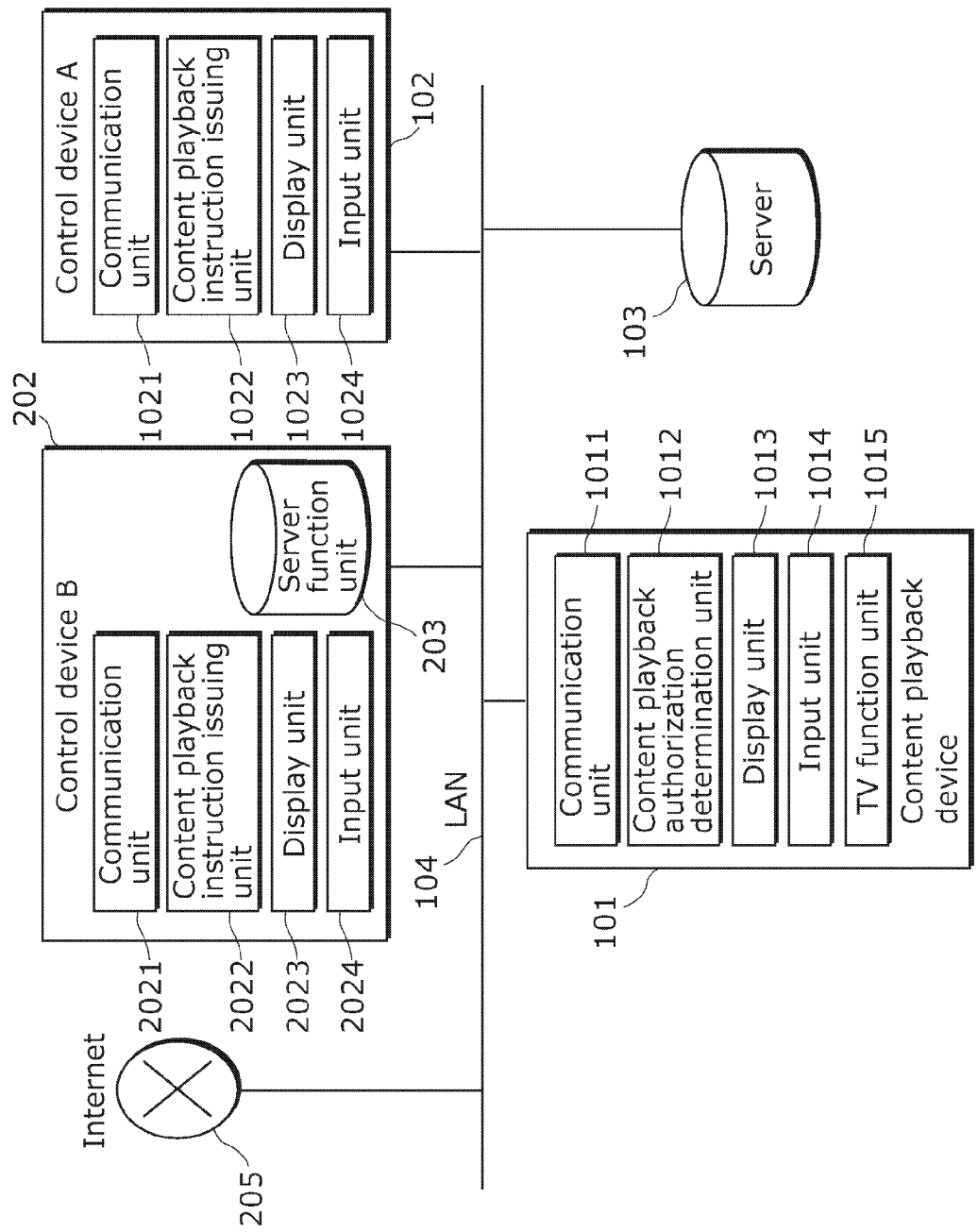
FIG. 4 is a diagram showing details of the configuration of a content playback system according to an embodiment 1 of the present invention.

FIG. 4 is a diagram showing details of the configuration of a content playback system according to the embodiment 1 of the present invention.

The control device A102, as shown in FIG. 4, includes a communication unit 1021, a content playback instruction issuing unit 1022, a display unit 1023, and an input unit 1024. The control device B202 includes a communication unit 2021, a content playback instruction issuing unit 2022, a display unit 2023, an input unit 2024, and a server function unit 203. The content playback device 101 includes a communication unit 1011, a content playback authorization determination unit 1012, a display unit 1013, an input unit 1014, and a TV function unit 1015. Functions of the components and relationships between the components will be described below in the description of operation of each component.

In other words, the content playback device 101 according to the embodiment 1 includes the communication unit 1011 which establishes communications with the control device and a server, the display unit 1013 which displays content, the input unit 1014 which accepts input from a user, and the content playback authorization determination unit 1012 which determines whether a content being displayed on the display unit 1013 is to be switched to acquired content. The content playback device 101 plays content acquired from the server, in accordance with control of the control device.

It should be noted that the "content being displayed" refers to content which is already being displayed on the display unit 1013 at the time of operation of the content playback authorization determination unit 1012. On the other hand, the "acquired content" refers to content which is acquired from a server through the communication unit 1011. The "server" may be a "server device" independently present on a communication network, or a "server function unit" which operates on the control device.

The content playback authorization determination unit 1012, specifically, performs the following operation. First, based on control of the control device, the content playback authorization determination unit 1012 determines whether it is necessary to acquire, from the user through the input unit 1014, instructions as to whether the content being displayed is to be switched to the acquired content. Then, when the content playback authorization determination unit 1012 acquires, from the user through the input unit 1014, a content switch authorization instruction indicating that the content is to be switched to the acquired content or when the content playback authorization determination unit 1012 determines that it is not necessary to acquire the instructions, the content playback authorization determination unit 1012 switches from the content being displayed on the display unit 1013 to the acquired content. On the other hand, when the content playback authorization determination unit 1012 acquires, from the user through the input unit 1014, a content switch rejection instruction indicating that the content is not to be switched to the acquired content, the content playback authorization determination unit 1012 causes the display unit 1013 to continue to display the content being displayed.

Initially, a case similarly to the use case 2 will be described where the control device B202 automatically detects update of content in the server device on the Internet 205, at which time the control device B202 automatically issues the content playback instruction to the content playback device 101.

First, the user accesses a service on the Internet 205 via the communication unit 2021 and the LAN 104 by operating the input unit 2024 of the control device B202 or directly operating the display unit 2023. Here, it is assumed that service to be accessed has a function to distribute video content related to a selected item such as news or weather forecast periodically or at a time when the information occurs. For example, when news is selected, latest news is to be distributed one after another.

The control device B202 acquires, through the communication unit 2021, video content to be distributed when the service is registered, saves the video content into the server function unit 203, and then exposes the video content. At a time of completion of the exposure, the control device B202 automatically causes the content playback instruction issuing unit 2022 to transmit the content playback instruction to the content playback device 101 to play the video content. This allows the user to view, using the content playback device 101, the updated content at a time when the content is distributed by the service.

Here, operation of the content playback device 101 in the above case will be described, with reference to FIG. 5. It is assumed that the user is viewing digital broadcasting (the content being displayed), using the TV function unit 1015 of the content playback device 101 until the time at which content is distributed. Also, it is assumed that the TV function unit 1015, although not described herein in any detail, includes all basic functionality necessary for digital broadcasting viewing such as a digital broadcasting tuner, a channel/program information management unit, a video and audio data extraction unit, and a video and audio data decoder.

First, upon distribution of new arrival from the service, a content playback event occurs in the control device B202. When the content playback event occurs ("Y" in step S501), the content playback instruction issuing unit 2022 of the control device B202 transmits a content playback authorization confirmation request signal (may be also simply denoted as a "content playback authorization request") to the content playback device 101 via the communication unit 2021 (step S502). The content playback authorization confirmation request requests the user to select whether to interrupt the currently viewing content and view content to be distributed. Typically, the content playback authorization confirmation request requests display of a content playback confirmation screen described below.

Once the communication unit 1011 of the content playback device 101 receives the content playback authorization confirmation request from the communication unit 2021 of the control device B202, the content playback authorization determination unit 1012 causes the display unit 1013 to display the content playback confirmation screen (step S503). In other words, when the content playback authorization determination unit 1012 determines that it is necessary to acquire instructions from the user, the content playback authorization determination unit 1012 causes the display unit 1013 to display the content playback confirmation screen prompting the user to input instructions through the input unit 1014.

Here, FIG. 6 is a diagram showing an example of the content playback confirmation screen displayed on the display unit 1013 of the content playback device 101. In FIG. 6, a content playback confirmation screen 1016 is displayed on a portion of the display unit 1013. In other words, the content being displayed is displayed in a region other than the content playback confirmation screen 1016 on the display unit 1013 shown in FIG. 6. The user checks the content playback confirmation screen 1016 while viewing the content being displayed.

Then, the content playback confirmation screen 1016 allows the user to select, via the input unit 1014 or the display unit 1013, either "Yes" or "No" as to whether to play content. When a message 1017 for allowing the user to recognize details of the content is included in the content playback authorization confirmation request, the message 1017 is displayed in the content playback confirmation screen 1016.

This allows the user to select, based on the details of the content, whether to interrupt TV viewing already performed and play the distributed video content (the acquired content), or continue the TV viewing without playing the distributed video content.

The user checks the content playback confirmation screen 1016 displayed on the display unit 1013, and selects content playback instruction operation (selects "Yes") or content playback rejection operation (selects "No") through the input unit 1014 (step S504). The content playback instruction operation (content playback authorization instruction) is operation (instructions) indicating that TV viewing is to be interrupted and the distributed video content is to be played. The content playback rejection operation (content playback rejection instruction) is operation (instructions) indicating that TV viewing is to be continued without playing the distributed video content.

When the input from the user is the content playback instruction operation ("Y" in step S505), the content playback device 101 sets content playback authorization information stored in the content playback authorization determination unit 1012 to "Authorized" (step S506). On the other hand, when the input from the user is the content playback rejection operation ("N" in step S505), the content playback device 101 sets the content playback authorization information to "Rejected" (step S507). Then, the content playback authorization determination unit 1012 transmits the set content playback authorization information to the control device B202 through the communication unit 1011 (step S508).

In other words, to switch from the content being displayed to the acquired content, the content playback authorization determination unit 1012 transmits a content playback authorizing signal, which authorizes playback of the acquired content, to the control device B202 through the communication unit 1011. On the other hand, to continue the display of the content being displayed, the content playback authorization determination unit 1012 transmits a content playback prohibiting signal, which rejects the playback of the acquired content, to the control device B202 through the communication unit 1011.

The control device B202 uses the communication unit 2021 to receive the content playback authorization information from the content playback device 101. The content playback instruction issuing unit 2022 determines whether the received content playback authorization information is "Authorized" or "Rejected" (step S509). When the content playback authorization information is "Authorized" ("Y" in step S509), the control device B202 transmits a content playback stop request to the content playback device 101 via the communication unit 2021 (step S510). Subsequently, the control device B202 transmits the content playback instruction signal (may be simply denoted as "content playback instruction") to the content playback device 101 via the communication unit 2021 (step S511). On the other hand, if the content playback authorization information is "Rejected" ("N" in step S509), the control device B202 does not play content. Thus, the control device B202 transitions again to a playback-event wait state (step S501).

The content playback authorization determination unit 1012 of the content playback device 101 performs a content playback stop process upon receipt of the content playback stop request from the control device B202 via the communication unit 1011 (step S512). "Stop" herein means that when there is content being played by the content playback device 101 serving as digital media renderer (DMR) function, the content playback device 101 stops the playback and transitions to a stopped state. In other words, in the present embodiment, TV viewing is assumed and thus the content playback stop process is not performed.

Upon receipt of the content playback instruction, the content playback authorization determination unit 1012 of the content playback device 101 acquires designated content from the server function unit 203 of the control device B202 (step S513), and plays the acquired content (step S514).

Next, the use case 1 will be described where the user operates the control device A102 to select content, and issues a content playback instruction from the control device A102 by manual operation at a time intended by the user to play the content.

First, the user performs input operation using the input unit 1024 of the control device A102, thereby acquires listing information of content saved in the server device 103 via the communication unit 1021, and displays the listing information on the display unit 1023. Mobile terminals, such as smartphones, tablets, remote controllers, and notebook PCs, and desktop PCs are assumed by way of example of the control device A102 in this case.

Next, the user selects content desired by the user to play from the listing information of content displayed on the display unit 1023, and makes input from the input unit 1024. The control device A102 having accepted the input from the user transmits the content playback instruction generated by the content playback instruction issuing unit 1022 to the content playback device 101 via the communication unit 1021. Then, the content playback device 101 having received the content playback instruction accesses the server device 103 to acquire the content, and plays the acquired content.

Here, operation of the content playback device 101 in the above case will be described, with reference to FIG. 7. It is assumed that the user is viewing digital broadcasting using the TV function unit 1015 of the content playback device 101 until a time at which the content is distributed.

First, upon selection of content by the user through the input unit 1024, the content playback event occurs in the control device A102. When the content playback event occurs ("Y" in S701), the content playback instruction issuing unit 1022 transmits the content playback stop request to the content playback device 101 via the communication unit 1021 (step S710). Subsequently, the control device A102 transmits the content playback instruction to the content playback device 101 via the communication unit 1021 (step S711).

The content playback authorization determination unit 1012 of the content playback device 101 performs the content playback stop process upon receipt of the content playback stop request from the control device A102 (step S712). "Stop" herein means that when there is content being played by the content playback device 101 serving as digital media renderer (DMR) function, the content playback device 101 stops the playback and transitions to a stopped state. In other words, in the present embodiment, TV viewing is assumed and thus the content playback stop process is not performed.

Upon receipt of the content playback instruction from the control device A102, the content playback authorization determination unit 1012 of the content playback device 101 acquires, from the server device 103, content designated by the content playback instruction (step S713), and plays the acquired content (step S714).

In other words, the content playback authorization determination unit 1012 determines that it is necessary to acquire instructions from the user when the content playback authorization determination unit 1012 has acquired, from the control device B202 through the communication unit 1011, a content playback confirmation request signal requesting the acquisition of the instructions from the user as shown in FIG. 5. On the other hand, the content playback authorization determination unit 1012 determines that it is not necessary to acquire instructions from the user when the content playback authorization determination unit 1012 has acquired, from the control device A102 through the communication unit 1011, the content playback instruction signal instructing the playback of the acquired content, without acquiring the content playback confirmation request signal as shown in FIG. 7.

It should be noted that the DLNA standards uses an AV transport (AVT) protocol defined by UPnP AV (Universal Plug and Play Audio Visual) standards for the transmission and reception of the content playback instruction or the content playback stop request between the digital media controller (DMC) and the digital media renderer (DMR). For example, the content playback instruction is implemented by successively executing a command SetAVTransportURI which indicates content and a command Play which instructs start of playback of the content. The content playback stop request is implemented in a command Stop.

The content playback authorization confirmation request described in the present embodiment can be implemented by, for example, adding a command "X_PlayConfirmation" to an AVT protocol command, and defining that the content can be played if "X_PlayConfirmationState", which is a state value included in a response to the AVT protocol command, is "OK," and that the content cannot be played if the state value is "NG." In the present embodiment, the content playback authorization confirmation request corresponds to the AVT command added to "X_PlayConfirmation" command, and the content playback authorization information corresponds to the AVT command added to "X_PlayConfirmation" command. An example telegram of the X_PlayConfirmationRequest is shown in FIG. 8. An example telegram of X_PlayConfirmationResponse is shown in FIG. 9.

As described above, according to the present embodiment, when the user operates the control device to give the content playback instruction the content playback confirmation screen can be displayed on the control device, and when the control device automatically gives the content playback instruction the content playback confirmation screen can be displayed on the content playback device. In other words, the necessity of the display of the content playback confirmation screen in the content playback device can be adaptively switched in response to circumstances.

In the above embodiment, the description is given where when the content playback device 101 receives the content playback authorization confirmation request, the content playback confirmation screen 1016 is displayed on the display unit 1013, prompting user operation. However, the present invention is not limited thereto. For example, when the content playback device 101 receives the content playback authorization confirmation request, the content playback authorization information may be set to "Rejected" and transmitted to the control device B202 without displaying the content playback confirmation screen 1016. In this manner, as in the use case 1, the content can be played only when the user operates the control device to select content and issues the content playback instruction from the control device by manual operation at a time intended by the user to play the content.

Alternatively, regarding the case where the content playback device 101 receives the content playback authorization confirmation request, a setting may be provided which switches between displaying the content playback confirmation screen 1016, transmitting the content playback authorization information "Rejected" without displaying the content playback confirmation screen 1016, and transmitting the content playback authorization information "Authorized" without displaying the content playback confirmation screen 1016.

Embodiment 2

It is common, in protocols between the digital media controller (DMC) and the digital media renderer (DMR) which are defined by the DLNA, that the control device makes the content playback stop request to the content playback device and then gives the content playback instruction for content desired by the user to play. Thus, in order not to stop the playback of content previously being played in the content playback device 101, it is necessary to conduct playback authorization confirmation prior to giving the content playback instruction. Thus, in the embodiment 1 of the present invention, the processing, as a specific example of the above case, has been described which conducts the playback authorization confirmation prior to giving the content playback instruction.

On the other hand, the present embodiment is applicable to protocols which do not need to make the content playback stop request prior to giving the content playback instruction. In the present embodiment, the content playback authorization confirmation request is made simultaneously with giving the content playback instruction by including content playback authorization confirmation request information (may simply denoted as "content playback authorization confirmation request") in the content playback instruction signal.

The configuration of the content playback system according to the present embodiment will be described, with reference to FIG. 4 as with the embodiment 1 of the present invention. Subsequently, processing according to the present embodiment will be described, with reference to the components show in FIG. 4.

Figure 10:
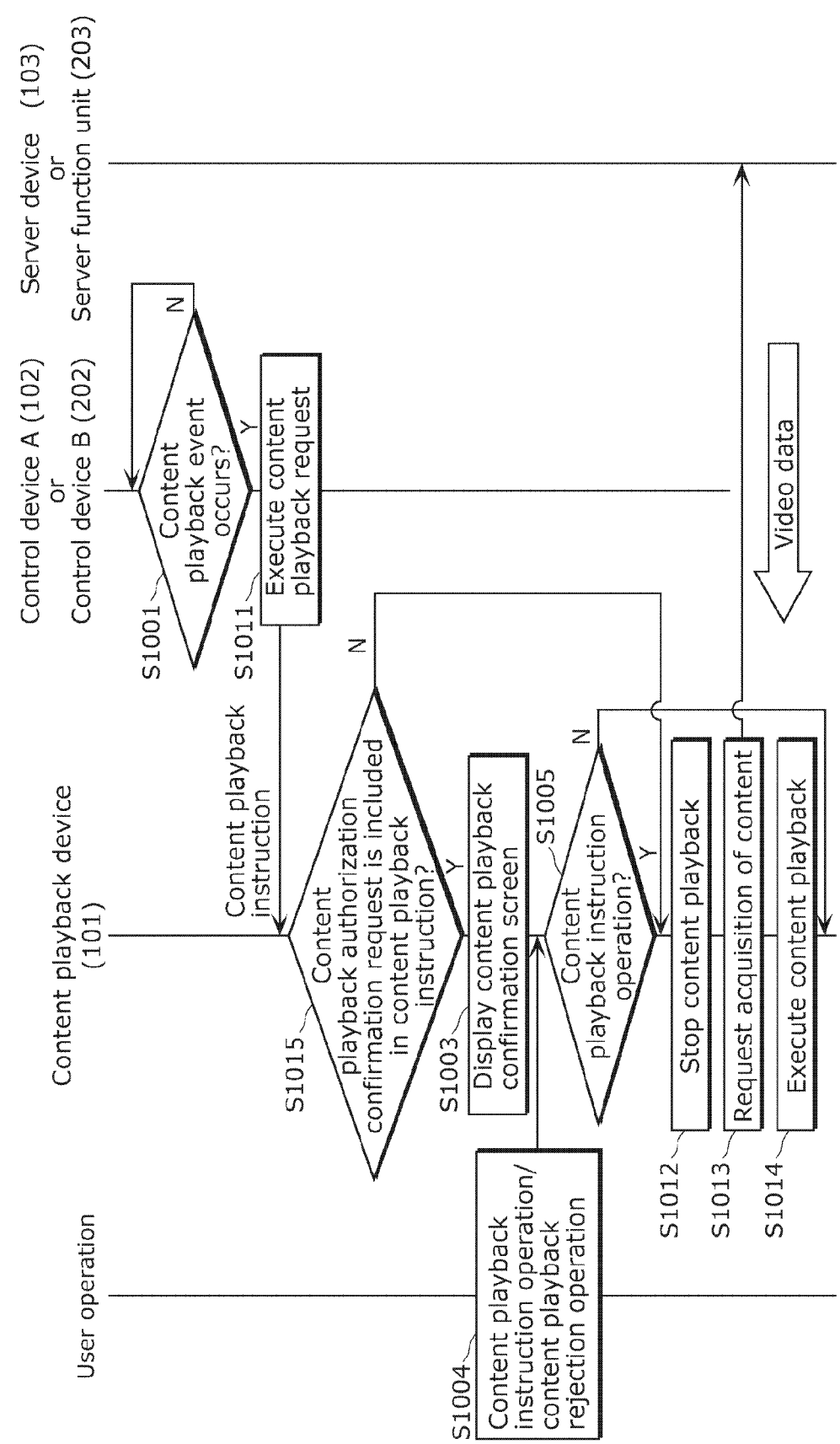
FIG. 10 is a flowchart illustrating processing for the use cases 1 and 2 of a content playback device according to an embodiment 2 of the present invention.

Initially, the use case 2 will be described where the control device B202 automatically detects update of content in the server device on the Internet 205, at which time the control device B202 automatically issues the content playback instruction. The overview of the use case 2 is the same as the embodiment 1 of the present invention, and thus the description thereof will be omitted. Details of the operation of the content playback device 101 according to the present embodiment will be described, with reference to FIG. 10.

First, it is assumed that the user is viewing digital broadcasting using the TV function unit 1015 of the content playback device 101 until a time at which content update or the like is distributed.

Next, upon distribution of new arrival from a service, the content playback event occurs in the control device B202. When the content playback event occurs ("Y" in step S1001), the control device B202 transmits the content playback instruction to the content playback device 101 (step S1011). In the use case, the content playback confirmation is required, and thus the control device B202 transmits the content playback authorization confirmation request in the content playback instruction.

Upon receipt of the content playback instruction, the content playback device 101 checks if the content playback authorization confirmation request is included in the content playback instruction (step S1015). In the use case 2, the content playback authorization confirmation request is included in the content playback instruction ("Y" in step S1015), and thus the content playback authorization determination unit 1012 displays the content playback confirmation screen 1016 on the display unit 1013 (step S1003). FIG. 6 is a diagram showing an example of the content playback confirmation screen 1016 displayed on the display unit 1013, the detailed description of which is the same as the embodiment 1 of the present invention. Thus, the description thereof will be omitted.

The user checks the content playback confirmation screen 1016 displayed on the display unit 1013, and selects either the content playback instruction operation (select "Yes") or the content playback rejection operation (select "No") through the input unit 1014 (step S1004). If the input from the user is the content playback rejection operation ("N" in step S1005), the content playback device 101 does not play the content. In other words, the content playback device 101 skips processing of steps S1012 to S1014 of FIG. 10.

On the other hand, when the input from the user is the content playback instruction operation ("Y" in step S1005), if there is content being played by the content playback device 101 serving as digital media renderer (DMR) function, the content playback device 101 performs a content playback stop process, which stops the playback of the content (step S1012), and then acquires the designated content from the server function unit 203 of the control device B202 (step S1013) and plays the acquired content (step S1014).

Next, the use case 1 will be described where the user operates the control device to select content and performs manual operation at a time intended by the user to play the content, and thereby the control device A102 issues a content playback instruction. The overview of the use case 1 is the same as the embodiment 1 of the present invention, and thus the description thereof will be omitted. Details of the operation of the content playback device 101 according to the present embodiment will be described, with reference to FIG. 10.

First, it is assumed that the user is viewing digital broadcasting using the TV function unit 1015 of the content playback device 101 until a time at which updated content or the like is distributed.

First, upon selection of content by the user through the input unit 1024, the content playback event occurs in the control device A102. When the content playback event occurs ("Y" in step S1001), the control device A102 transmits the content playback instruction to the content playback device 101 (step S1011). In the use case, the content playback confirmation is not required, and thus the control device A102 transmits the content playback instruction in which the content playback authorization confirmation request is not included.

Upon receipt of the content playback instruction, the content playback device 101 checks if the content playback authorization confirmation request is included in the content playback instruction (step S1015). Since the content playback authorization confirmation request is not included in the content playback instruction in the use case 1 ("N" in step S1015), the content playback device 101 skips steps S1003 and S1005 of FIG. 10. If there is content being played by the content playback device 101 serving as digital media renderer (DMR) function, the content playback device 101 performs a content playback stop process, which stops the playback of the content (step S1012), and then acquires the designated content from the server device 103 (step S1013) and plays the acquired content (step S1014).

In other words, when the content playback authorization determination unit 1012 acquires the content playback instruction signal instructing the playback of the acquired content from the control device A102 or the control device B202 through the communication unit 1011, if content playback confirmation request information requesting acquisition of instructions from the user is included in the content playback instruction signal, the content playback authorization determination unit 1012 determines that it is necessary to acquire instructions from the user. On the other hand, the content playback authorization determination unit 1012 determines that it is not necessary to acquire instructions from the user if the content playback confirmation request information is not included in the content playback instruction signal.

It should be noted that in the DLNA standards, the content playback device 101 can be implemented, as an extension of the AVT protocol for use between the digital media controller (DMC) and the digital media renderer (DMR), by adding the element of "X_PlayConfirmation" to the Play command. An example telegram of PlayRequest which includes the element of X_PlayConfirmation is shown in FIG. 11.

According to the above embodiment, a content playback device can be implemented in which the content playback confirmation screen is displayed on the control device when the user operates the control device to give the content playback instruction, and the content playback confirmation screen is displayed on the content playback device when the control device automatically gives the content playback instruction.

In the above embodiment, the description is given where when the content playback device 101 receives the content playback instruction which include the content playback authorization confirmation request, the content playback confirmation screen 1016 is displayed on the display unit 1013, prompting user operation. However, the present invention is not limited thereto. For example, when the content playback device 101 receives the content playback authorization confirmation request, the content may not be played without displaying even the content playback confirmation screen. In this manner, as in the use case 1, content can be played from the server device only when the user operates the control device to select the content and issues the content playback instruction by manual operation at a time intended by the user to play the content.

Moreover, regarding the case where the content playback device 101 receives the content playback instruction which include the content playback authorization confirmation request, a setting may be provided which switches between displaying the content playback confirmation screen 1016, not playing content without displaying the content playback confirmation screen 1016, and playing content without displaying the content playback confirmation screen 1016.

In the embodiment 1 and the embodiment 2 according to the present invention, the description has been given where whether the content playback confirmation screen 1016 is to be displayed or not is switched based on the content playback authorization confirmation request transmitted from the control device. However, the present invention is not limited thereto. For example, whether the content playback confirmation screen is to be displayed or not may be switched based on information other than the content playback authorization confirmation request.

Specifically, if information as to whether the content playback instruction from the control device are given by manual operation by the user or automatically occurred can be acquired, whether the content playback confirmation screen 1016 is to be displayed or not may be switched based on the information.

In other words, when the content playback authorization determination unit 1012 acquires the content playback instruction signal instructing the playback of the acquired content from the control device A102 or the control device B202 through the communication unit 1011, if transmission of the content playback instruction signal automatically occurs, the content playback authorization determination unit 1012 determines that it is necessary to acquire instructions from the user. On the other hand, if the transmission of the content playback instruction signal is made by manual operation by the user, the content playback authorization determination unit 1012 determines that it is not necessary to acquire instructions from the user.

Moreover, if attribute information of the control device can be acquired, whether the content playback confirmation screen 1016 is to be displayed or not may be switched based on the information. The attribute information of the control device may be, for example, product model information of the control device, a distinguished name or ID designating the control device, or IP address information or MAC address information.

Furthermore, if whether the content playback confirmation screen 1016 is to be displayed or not is switched according to the attribute information of the control device, a table corresponding to each control device may be provided in the content playback device 101, so that a setting can be made to each control device as to whether the content playback confirmation screen 1016 is to be displayed, content is to be played without displaying the content playback confirmation screen 1016, or content is not to be played without displaying the content playback confirmation screen 1016. Alternatively, the settings may be done manually, or automatically set to predefined values. Also, for content playback instruction from a control device not present in the tables, a predefined operation may be performed.

In other words, the content playback authorization determination unit 1012 pre-stores a table in which the attribute information of the control device A102 or the control device B202, a result of determining whether it is necessary to acquire instructions from a user, and a result of determining whether content is to be switched to the acquired content are associated with each other. Then, based on the stored table, the content playback authorization determination unit 1012 operates according to the results associated with the attribute information of the control device A102 or the control device B202 from which the content playback instruction signal instructing the playback of the acquired content originates.

The communication unit 1011 and the content playback authorization determination unit 1012 included in the content playback device 101 of FIG. 4 can be implemented in dedicated hardware (dedicated circuit) which processes the various telegrams and information described above. As alternative, typically, the communication unit 1011 and the content playback authorization determination unit 1012 can be implemented in software. In other words, the operation described above may be written to software stored in a ROM, and the software may be executed in a common MPU or memory. While the ROM is preferably a nonvolatile recording medium such as a rewritable ROM, the ROM can also be implemented in a volatile recording medium.

It should be noted that the content playback device, the content playback system, and the content playback method according to the present invention have one object to further improve the content playback scheme conforming to the DLNA. Thus, communication is established between the server device and the content playback device, using a communication protocol conforming to the digital living network alliance (DLNA) standard. Thus, the notations of respective information and each telegram have been described by way of example, in forms conforming to the DLNA. The present invention, however, is also applicable to content playback devices and content playback systems that do not conform to the DLNA.

Moreover, the present invention is not limited to the above embodiments, and it is to be understood that various modifications are possible to the configuration of the embodiments, content and the form of the telegram, and flowchart sequence, and intended to be included within the scope of the present invention.

INDUSTRIAL APPLICABILITY

The content playback device, the content playback system, and the content playback method according to the present invention are useful as a system and a method which play content according to a content playback instruction from a control device on a network.

REFERENCE SIGNS LIST

101 Content playback device
102 Control device A
103 Server device
104 LAN
202 Control device B
203 Server function unit
205 Internet
1011, 1021, 2021 Communication unit
1012 Content playback authorization determination unit
1013, 1023, 2023 Display unit
1014, 1024, 2024 Input unit
1015 TV function unit
1022, 2022 Content playback instruction issuing unit

The invention claimed is:

1. A content playback device for playing a content, which is acquired from a server, in accordance with control of a control device, the content playback device comprising:
a display unit configured to display a content;
an input unit configured to receive input from a user; and
a computer and a memory having instructions for causing the computer to
communicate with the control device and the server; and
determine whether to interrupt a content being displayed on the display unit and switch from the content being displayed to an acquired content which is acquired from the server through the communication unit,
wherein the computer is further programmed to
control the display unit to display a content playback confirmation screen when the computer determines, based on the control of the control device, that it is necessary to acquire, from the user through the input unit, an instruction as to whether to switch from the content being displayed to the acquired content,
switch the content being displayed on the display unit to the acquired content, when the user instructs, on the content playback confirmation screen through the input unit, to switch the content being displayed to the acquired content,
cause the display unit to continue display of the content being displayed, when the user does not instruct, on the content playback confirmation screen through the input unit, to switch the content being displayed to the acquired content, and
switch the content being displayed on the display unit to the acquired content without displaying the content playback confirmation screen on the display unit, when the computer determines, based on the control of the control device, that it is not necessary to acquire, from the user through the input unit, the instruction as to whether to switch the content being displayed to the acquired content.

2. The content playback device according to claim 1, wherein the computer is further programmed to
determine that it is necessary to acquire the instruction from the user and control the display unit to display the content playback confirmation screen, when the computer acquires, from the control device through the communication unit, a content playback confirmation request signal requesting acquisition of the instruction from the user, and
control the display unit not to display the content playback confirmation screen, when the computer acquires a content playback instruction signal instructing playback of the acquired content without acquiring the content playback confirmation request signal.

3. The content playback device according to claim 1, wherein when the computer acquires, from the control device through the communication unit, a content playback instruction signal instructing playback of the acquired content, the computer is further programmed to
determine that it is necessary to acquire the instruction from the user and control the display unit to display the content playback confirmation screen, when content playback confirmation request information requesting acquisition of the instruction from the user is included in the content playback instruction signal, and
determine that it is not necessary to acquire the instruction from the user and control the display unit not to display the content playback confirmation screen, when the content playback confirmation request information is not included in the content playback instruction signal.

4. The content playback device according to claim 1, wherein when the computer acquires, from the control device through the communication unit, a content playback instruction signal instructing playback of the acquired content, the computer is further programmed to
determine that it is necessary to acquire the instruction from the user and control the display unit to display the content playback confirmation screen, when transmission of the content playback instruction signal automatically occurs, and
determine that it is not necessary to acquire the instruction from the user and control the display unit not to display the content playback confirmation screen, when the transmission of the content playback instruction signal is made by manual operation by the user.

5. The content playback device according to claim 1, wherein the computer is further programmed to pre-store a table in which attribute information of the control device, a result of determining whether it is necessary to acquire the instruction from the user, and a result of determining whether switching from the content being displayed to the acquired content is to be authorized are associated with one another, and operate in accordance with the results associated with the attribute information of the control device from which a content playback instruction signal instructing playback of the acquired content is transmitted.

6. A content playback system comprising a control device, a server, and a content playback device,
the content playback device including:
a display unit configured to display a content;
an input unit configured to receive input from a user; and
a computer and a memory having instructions for causing the computer to communicate with the control device and the server; and
determine whether to interrupt a content being displayed on the display unit and switch from the content being displayed to an acquired content which is acquired from the server through the communication unit,
wherein the computer is further programmed to
control the display unit to display a content playback confirmation screen when the computer determines, based on control of the control device, that it is necessary to acquire, from the user through the input unit, an instruction as to whether to switch from the content being displayed to the acquired content,
switch the content being displayed on the display unit to the acquired content, when the user instructs, on the content playback confirmation screen through the input unit, to switch the content being displayed to the acquired content,
cause the display unit to continue display of the content being displayed, when the user does not instruct, on the content playback confirmation screen through the input unit, to switch the content being displayed to the acquired content, and
switch the content being displayed on the display unit to the acquired content without displaying the content playback confirmation screen on the display unit, when the computer determines, based on the control of the control device, that it is not necessary to acquire, from the user through the input unit, the instruction as to whether to switch the content being displayed to the acquired content.

7. A content playback method for playing a content acquired from a server in accordance with control of a control device, the content playback method comprising:
communicating with the server and a control device;
determining whether to interrupt content being displayed on a display unit and switch from the content being displayed to an acquired content which is acquired from the server,
controlling the display unit to display a content playback confirmation screen when it is determined, based on the control of the control device, that it is necessary to acquire a user instruction as to whether to switch from the content being displayed to the acquired content;
switching the content being displayed on the display unit to the acquired content, when the user instruction instructs to switch the content being displayed to the acquired content;
causing the display unit to continue display of the content being displayed, when the user instruction does not instruct to switch the content being displayed to the acquired content; and
switching the content being displayed on the display unit to the acquired content without displaying the content playback confirmation screen on the display unit, when it is determined, based on the control of the control device, that it is not necessary to acquire the user instruction as to whether to switch the content being displayed to the acquired content.

* * * * *